(12) United States Patent
Holen et al.

(10) Patent No.: US 12,366,277 B2
(45) Date of Patent: Jul. 22, 2025

(54) SYSTEM AND METHOD FOR DAMPING FORCES EXERTED ON A CABLE

(71) Applicant: Cameron International Corporation, Houston, TX (US)

(72) Inventors: Dag Holen, Kristiansand (NO); Kristian Tindvik, Kristiansand (NO); Rune Skibsrud, Bygland (NO)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 18/680,090

(22) Filed: May 31, 2024

(65) Prior Publication Data

US 2024/0309926 A1 Sep. 19, 2024

Related U.S. Application Data

(62) Division of application No. 17/247,653, filed on Dec. 18, 2020, now Pat. No. 12,000,456.

(51) Int. Cl.
*F16F 7/12* (2006.01)
*E21B 19/02* (2006.01)

(52) U.S. Cl.
CPC .............. *F16F 7/123* (2013.01); *E21B 19/02* (2013.01); *F16F 2226/04* (2013.01); *F16F 2230/0005* (2013.01); *F16F 2230/0047* (2013.01); *F16F 2232/08* (2013.01); *F16F 2236/06* (2013.01)

(58) Field of Classification Search
CPC .............. F16F 7/123; F16F 2230/0047; F16F 2232/08; F16F 2236/06; E21B 19/02
See application file for complete search history.

(56) References Cited

U.S. PATENT DOCUMENTS

| | | |
|---|---|---|
| 2015/0259181 A1 | 9/2015 | Billiot |
| 2019/0195304 A1 | 6/2019 | Dubost |
| 2022/0196104 A1 | 6/2022 | Holen |

FOREIGN PATENT DOCUMENTS

| | | | | |
|---|---|---|---|---|
| AU | 2019257490 A1 | * | 5/2020 | |
| CN | 108425977 A | | 8/2018 | |
| EP | 2982417 A1 | * | 2/2016 | ......... A62B 35/0081 |
| WO | 2011107706 A1 | | 9/2011 | |
| WO | 2015143544 A1 | | 10/2015 | |
| WO | 2016154351 A1 | | 9/2016 | |

* cited by examiner

*Primary Examiner* — Melody M Burch
(74) *Attorney, Agent, or Firm* — Jeffrey D. Frantz

(57) ABSTRACT

A method includes coupling a damper to a cable and a load, and moving the damper, the cable, the load, or a combination thereof. In response to the movement, slack is introduced into the cable, and the slack is suddenly released, which exerts a tensile load on the damper and the cable. The damper is configured to dampen the tensile load exerted on the cable.

20 Claims, 7 Drawing Sheets

SYSTEM AND METHOD FOR DAMPING FORCES EXERTED ON A CABLE

CROSS-REFERENCE TO RELATED APPLICATION

This application claims priority as a divisional application of U.S. patent application Ser. No. 17/247,653, filed Dec. 18, 2020, which is incorporated by reference herein in its entirety.

BACKGROUND

Drilling rigs form wellbores in the Earth by advancing a drill string with a drill bit located at its distal end. The drill string is generally made up of connectable sections of drill pipe, which are added on to the drill string as the drilling depth progresses. When in drilling mode, the rig may employ a top drive to rotate the drill string and a drawworks to lower the drill string into the progressing wellbore. Similarly, other types of oilfield tubulars, such as casing, may be run into the wellbore as strings that are sequentially extended in length by adding new segments of tubulars to the top of the previously-deployed string.

The tubulars are often stored in a fingerboard, sometimes vertically as stands of two or more joints of tubulars connected together. Pipe handling equipment, such as a tubular delivery arm (TDA), moves the tubulars onto the rig, connects them together to form stands, and then stores the stands in the fingerboard. When the rig is ready to use a stored tubular stand, the tubular stand is retrieved from the fingerboard and brought to well center using the same or other pipe handling equipment.

The pipe handling equipment may be supported by a cable (e.g., a wire). The cable may be used to move the tubular delivery arm horizontally and/or vertically. Occasionally, slack may inadvertently be introduced into the cable (e.g., while the pipe handling equipment is being lowered). The slack may suddenly be released, causing the pipe handling equipment to accelerate downward rapidly, which exerts a sudden tension force on the cable. This force may damage the cable. This damage may go undetected or be difficult to detect. The force may also break the cable, which may drop the tubular handling equipment, presenting risks to personnel and equipment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A damper is disclosed. The damper includes an upper connector configured to be connected to a cable. The damper also includes a lower connector configured to be connected to a load. The damper also includes a body extending between and connecting together the upper and lower connectors. The body includes a first portion and a second portion. The first portion is configured to experience greater plastic strain than the second portion.

In another embodiment, the damper is configured to dampen a force exerted on a cable when a load that is supported by the cable experiences a downward acceleration. The damper includes an upper connector configured to be connected to the cable. The damper also includes a body configured to be connected to the upper connector. The body includes a middle portion, a first laterally offset portion, and a second laterally offset portion. The middle portion is positioned between the first and second laterally offset portions. The middle portion is configured to experience more plastic strain than the first and second laterally offset portions when the force is greater than a first threshold. The middle portion is configured to stretch more than the first and second laterally offset portions when the force is greater than the first threshold. The first and second laterally offset portions are configured to at least partially straighten while the middle portion stretches. The middle portion is configured to break, and the first and second laterally offset portions are configured to remain intact, when the force is greater than a second threshold. The damper also includes a lower connector configured to be connected to the body and the load. The damper also includes a cover positioned between the upper and lower connectors. The body is positioned at least partially within the cover.

A method is also disclosed. The method includes coupling a damper to a cable and a load such that the damper is positioned between the cable and the load. The method also includes moving the damper, the cable, the load, or a combination thereof. In response to the movement, slack is introduced into the cable, and the slack is suddenly released, which exerts a tensile force on the damper and the cable. The damper is configured to dampen the tensile force exerted on the cable. The damper includes a first portion and a second portion. The first portion is configured to experience more plastic strain than the second portion.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
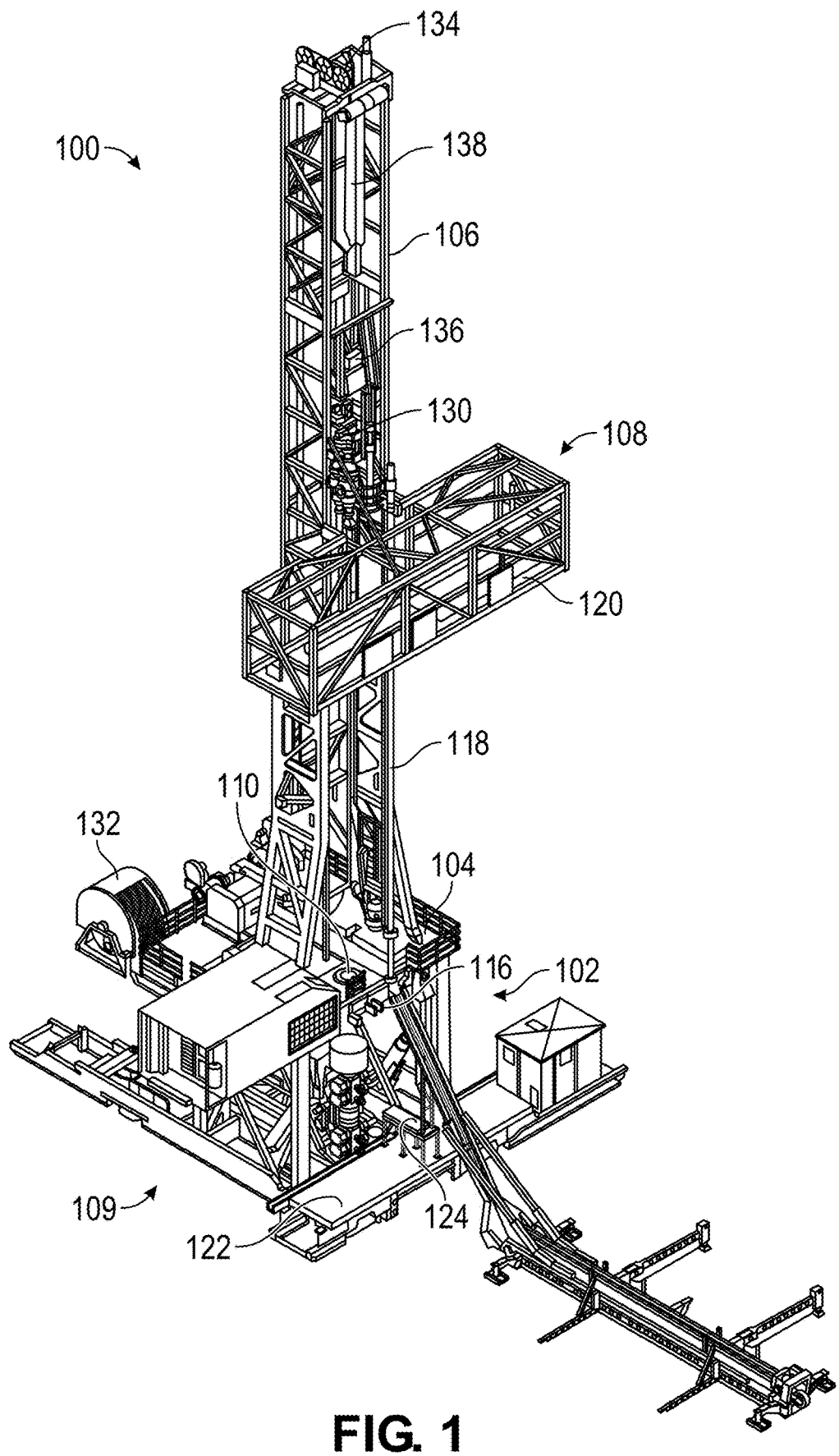
FIG. 1 illustrates a perspective view of a drilling rig system, according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

A damping system and method are described below. The damping system includes a damper that may be connected between a cable and a tool or machine. For example, the tool or machine may be suspended from the cable, and the damper may be coupled to and positioned vertically between the wire and the tool or machine. If the tool or machine suddenly accelerates downward, which exerts a tensile force on the cable, the damper may absorb the kinetic energy that results from this force. This may serve to protect the cable (e.g., prevent the cable from breaking).

Before detailing several embodiments of the damping system and method, it will be instructive to discuss an embodiment of the drilling rig system that implements this damping system and/or method. Thereafter, the damping system and method will be understood with reference to the drilling rig system, with it being appreciated that the drilling rig system disclosed is but one example among many contemplated for executing various embodiments of the structures and processes discussed herein.

Accordingly, FIG. 1 illustrates a perspective view of a drilling rig system 100, according to an embodiment. The drilling rig system 100 may generally include a catwalk 102, a rig floor 104, a mast 106, a stand storage assembly 108, and a substructure 109, among potentially many other components. The rig floor 104 may be supported above the ground by the substructure 109. Furthermore, on the rig floor 104, a well center 110 may be defined, which may demark a center of a wellbore beneath the drilling rig system 100. Various equipment may be located at or above the well center 110 to drill, trip in, or trip out, depending on the drilling or completion operation that is active at any given point. Further, below the rig floor 104, and above, or slightly below, the ground (i.e., in the "cellar" of the rig system 100), equipment may be positioned such as a blowout preventer, casing spool, casing head, rotary seals, etc.

The catwalk 102 may be oriented at an incline, and may be configured to deliver tubulars (e.g., drill pipe, casing, etc.) from a horizontal configuration on the ground up to or near the rig floor 104. More particularly, pipe handling equipment 136, such as a tubular delivery arm (TDA), may be configured to receive a tubular from the catwalk 102. The pipe handling equipment 136 may then be used to join the tubular with other tubular(s) to form a stand 118 (e.g., while supported in a mousehole 116). The pipe handling equipment 136 may also store the stand 118 in the stand storage assembly 108. The pipe handling equipment 136 may be suspended from one or more cables 138. As used herein, the cable 138 may include, but is not limited to, a wire, a chain, or the like.

The stand storage assembly 108 may include a fingerboard 120, which may receive and support the top ends (also referred to as the female ends or box ends) of the stands 118. A setback platform 122 may be positioned below the fingerboard 120 and may support the lower ends (also referred to as the male ends or pin ends) of the stands 118. As such, the stands 118 may be held in position, in a vertical orientation, and prepared for later use. As shown, the setback platform 122 may be positioned at an elevation that is below the rig floor 104 (e.g., on the baseboxes of the substructure 109). A lower constraint 124 may be positioned at the setback platform 122 level, and may be configured to engage the lower ends of the stands 118 as they are removed from the fingerboard 120 and received into a stand handoff position.

The mast 106 may include hoisting and drilling equipment, such as, for example a top drive 130. The top drive 130 may be movable up and down along the mast 106 (e.g., using a drawworks 132) attached via a cable to a crown block 134 at the top of the mast 106, and a travelling block that is coupled to the top drive 130. The top drive 130 may be configured to stab into the top end of the stand 118 above well center 110. For example, stands 118 may be brought into connection with an upper connection of previously-run drill string sections (i.e., a "stump"). Tongs may then be provided on the rig floor 104, which may connect the stand 118 to the previously-run drill string. The top drive 130 may then rotate the stand 118 (now made up to the tubular string) to rotate the drill string.

Figure 3:
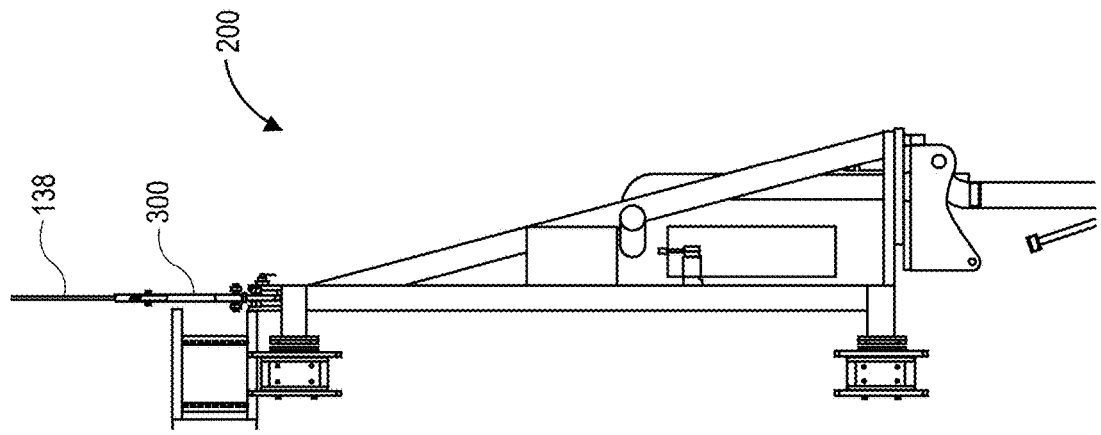
FIG. 3 illustrates a side view of the load, according to an embodiment.
Figure 2:
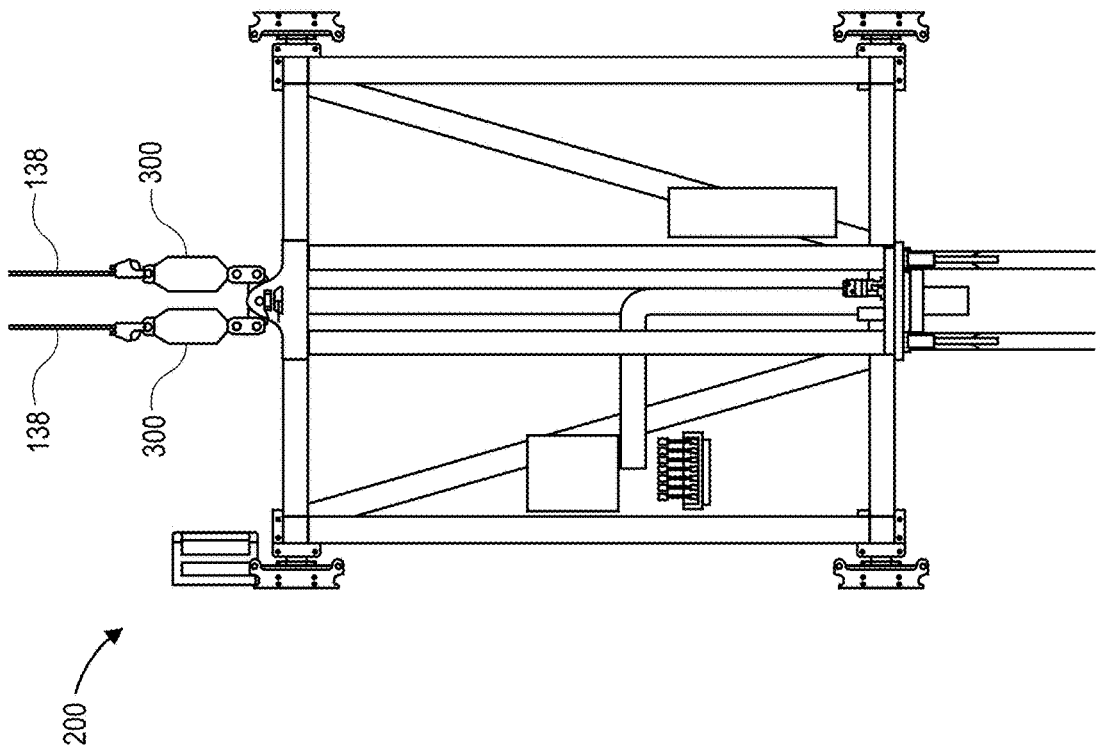
FIG. 2 illustrates a front view of a load (e.g., a tubular delivery arm), according to an embodiment.

FIG. 2 illustrates a front view of a load 200, and FIG. 3 illustrates a side view of the load 200, according to an embodiment. The load 200 may be or include at least a portion of the pipe handling equipment 136 shown in FIG. 1. For example, the load 200 may be or include a tubular delivery arm. However, the load 200 may also or instead be or include any device that may be suspended from the cable(s) 138.

One or more dampers 300 may be coupled to and/or positioned between the cable(s) 138 and the load 200. As described in greater detail below, if/when the load 200 experiences a sudden downward acceleration, which exerts a tensile force on the cable(s) 138, the damper(s) 300 may be configured to extend to dampen this force, which may serve to protect the cable(s) 138.

Figure 4:
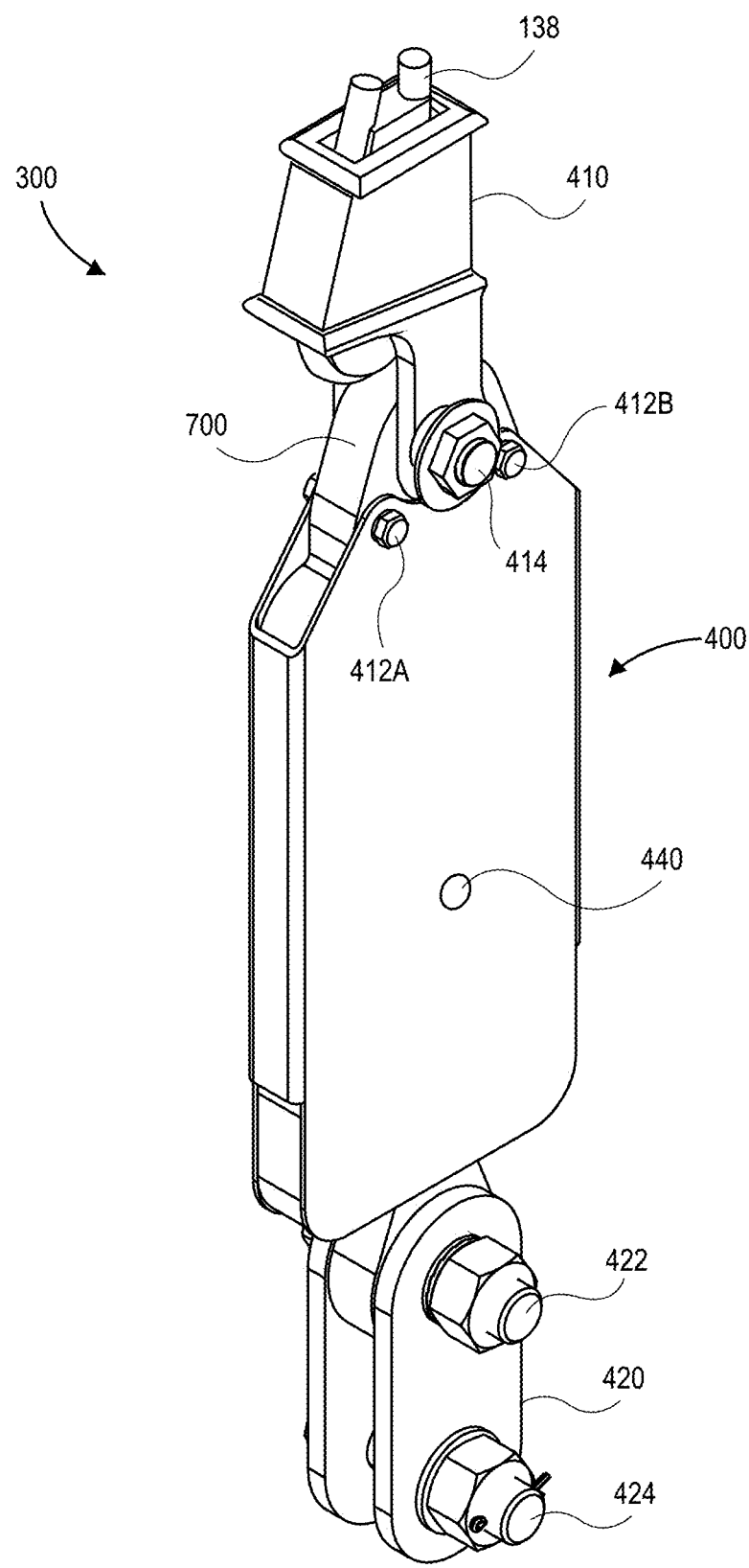
FIG. 4 illustrates a perspective view of a damper, according to an embodiment.
Figure 5:
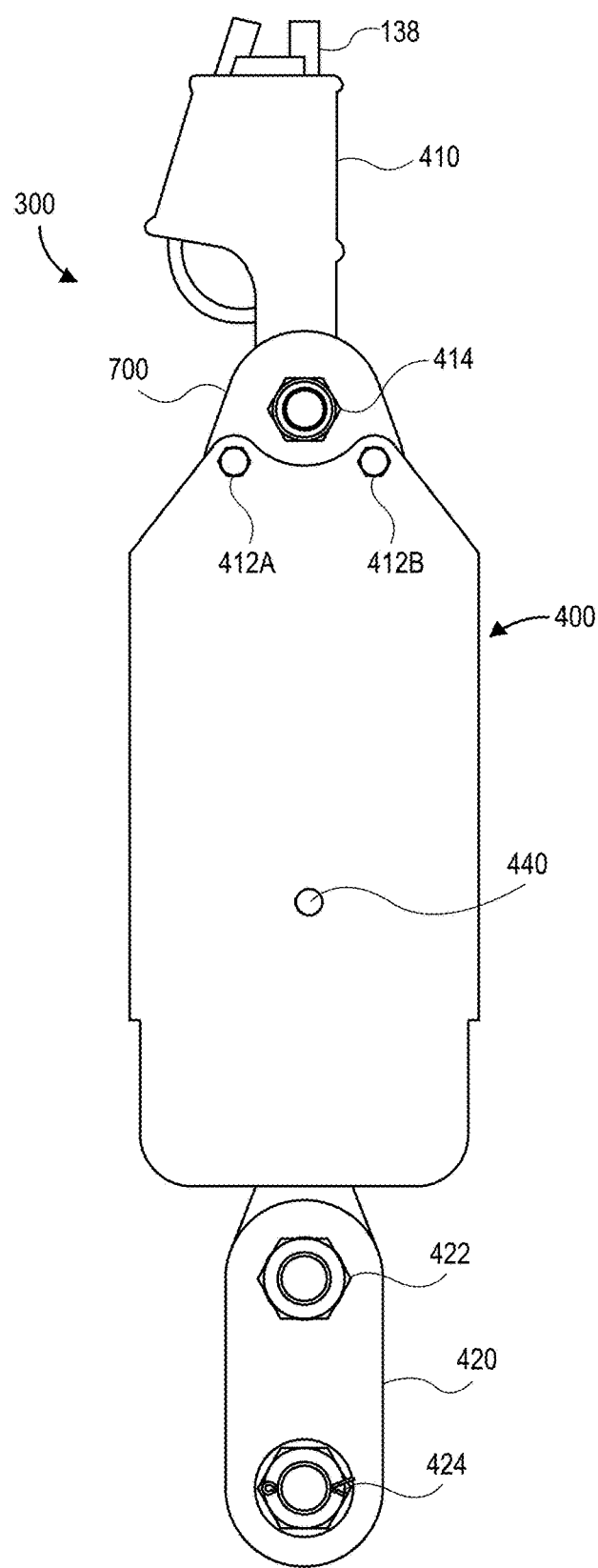
FIG. 5 illustrates a front view of the damper, according to an embodiment.
Figure 6:
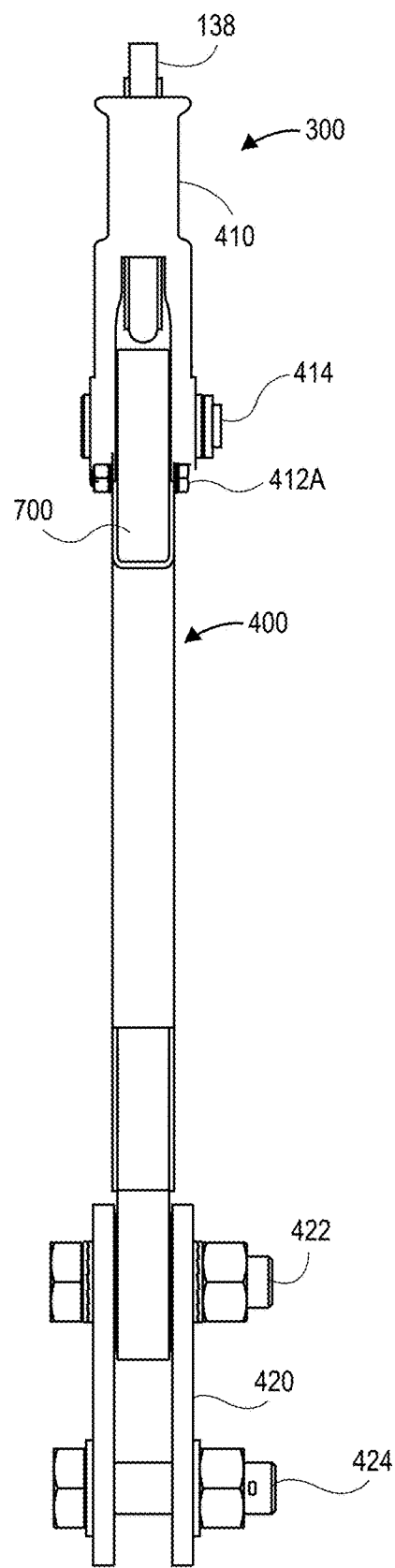
FIG. 6 illustrates a side view of the damper, according to an embodiment.

FIGS. 4-6 illustrate views of the damper 300, according to an embodiment. The damper 300 may include a cover 400. The cover 400 may be made up of one or more sections that may be connected together and contain, protect, or are otherwise positioned outward of various internal components (e.g., a body 700 of the damper 300). The body 700 is described in greater detail below with reference to FIGS. 7 and 8. The cover 400 may be configured to be coupled to the body 700 via one or more fasteners (two are shown: 412A, 412B).

The damper 300 may also include a first (e.g., upper) connector 410 and a second (e.g., lower) connector 420. The cover 400 and/or the body 700 may be positioned between the upper and lower connectors 410, 420. The upper connector 410 may be configured to receive and/or be coupled to the cable(s) 138. The upper connector 410 is shown as a wedge socket; however, in other embodiments, the upper connector 410 may be another type of cable end connection such as a spelter socket or shackle. The upper connector 410 may be coupled to the body 700 via one or more fasteners (e.g., bolts) 414.

The lower connector 420 may be configured to be coupled to the body 700 via one or more fasteners (e.g., bolts) 422. The lower connector 420 may also be configured to be coupled to the load 200 (see FIGS. 2 and 3) via one or more fasteners (e.g., bolts) 424. For example, a connector of the load 200 may be secured between front and rear portions of the lower connector 420 and between the upper and lower fasteners 422, 424.

The damper 300 may also include a sensor 440. The sensor 440 may be coupled to the cover 400, the body 700, or a combination thereof. The sensor 440 may be configured to measure a stress, a strain, a plastic deformation, or a combination thereof experienced by the damper 300. For example, the sensor 440 may be or include a strain gauge.

Figure 7:
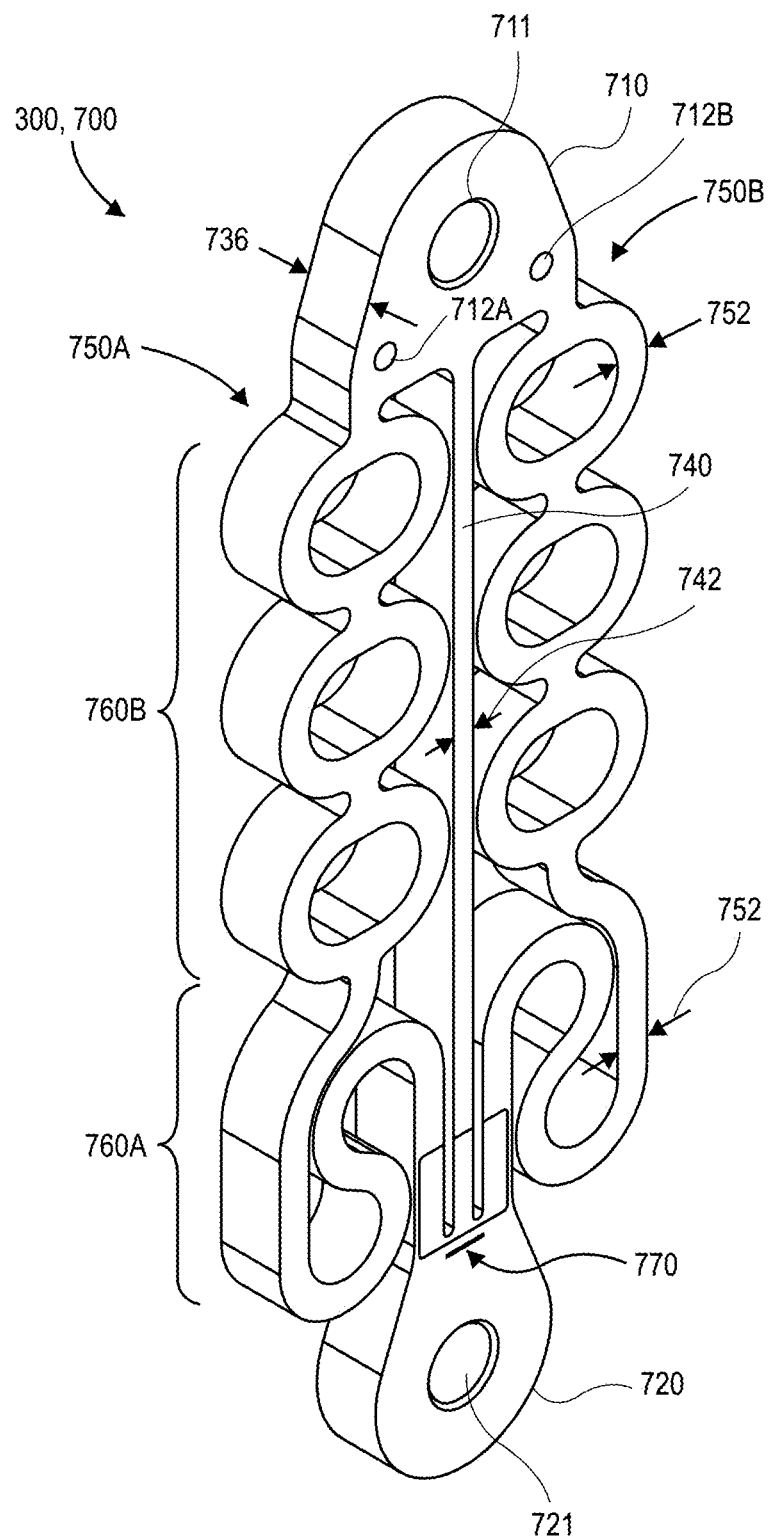
FIG. 7 illustrates a perspective view of the damper (with the cover removed), according to an embodiment.
Figure 8:
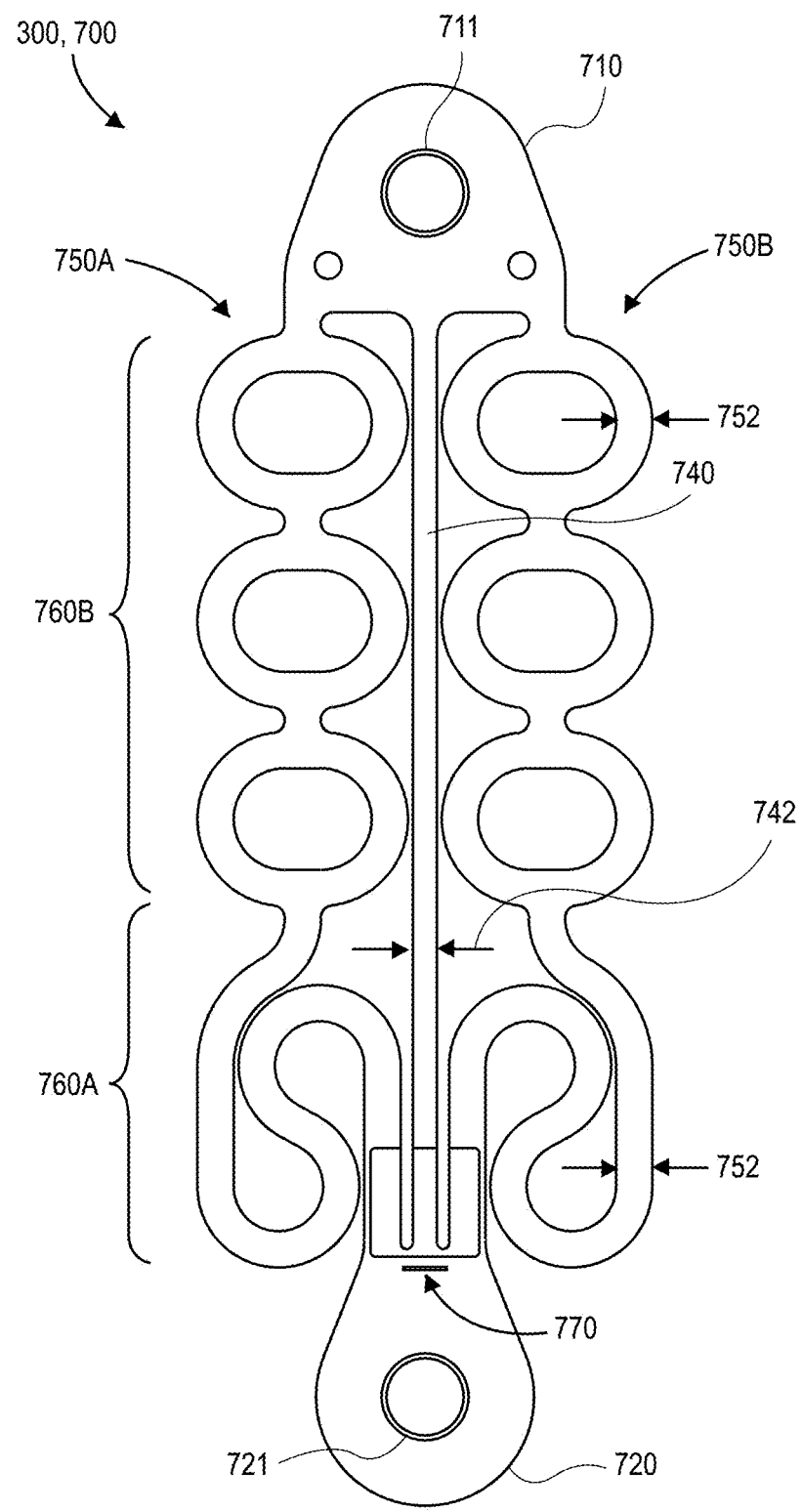
FIG. 8 illustrates a front view of the damper (with the cover removed), according to an embodiment.

FIGS. 7 and 8 illustrate views of the body 700 of the damper 300, according to an embodiment. The body 700 may also or instead be referred to as the "main portion" of the damper 300. The body 700 may be positioned at least partially within the cover 400 and at least partially between the connectors 410, 420. The cover 400 may serve to protect the body 700.

The body 700 may include a single (e.g., integral) component with cutouts formed therein, or body 700 may include multiple components that are coupled (e.g., welded) together. The body 700 may be made of metal. For example, the body 700 may be made of steel that has a ductile behavior when stresses exceed a yield stress of the body 700. For example, the body 700 may take the working load limit of the cable 138 (or more) without overstress, which may help to prevent the cable 138 from breaking, as described below. The size of the body 700 may be determined and/or depend upon the load 200 suspended therefrom and/or the kinetic energy that is to be absorbed by the body 700.

The body 700 may include one or more openings (two are shown: 712A, 712B) that are configured to receive the fasteners 412A, 412B to couple the cover 400 to the body 700. The body 700 may also include an upper connector 710 that defines an opening 711 that is configured to receive the fastener 414 to couple the upper connector 410 to the body 700. The body 700 may also include a lower connector 720 that defines an opening 721 that is configured to receive the fastener 422 to couple the lower connector 420 to the body 700.

The body 700 may also include a first portion 740 that is positioned at least partially between the connectors 410, 420 and the connectors 710, 720. The first portion 740 may also or instead be referred to as a middle portion or a center string. The middle portion 740 may be substantially aligned with the connectors 410, 420 and the connectors 710, 720. More particularly, the middle portion 740 may be substantially aligned with the openings 711, 721 through which the fasteners 412, 422 may extend. The middle portion 740 may be substantially straight and vertical. A width 742 of the middle portion 740 may depend upon the load 200. In an example, the width 742 may be from about 5 mm to about 75 mm or from about 10 mm to about 50 mm.

When a tensile force exerted on the damper 300 is less than a first (e.g., lower) threshold, the middle portion 740 may be configured to support the load 200 (e.g., by itself, with no help from portions 750A, 750B). In addition, when the tensile force is less than the first threshold, the middle portion 740 may be configured to remain substantially rigid and support the load 200 with minimal damping function. For example, the middle portion 740 may be configured to support the load 200 without experiencing plastic deformation.

The body 700 may also include one or more second portions (two are shown: 750A, 750B) positioned laterally adjacent to the middle portion 740. The second portions 750A, 750B may also or instead be referred to as laterally offset portions or outer deformation bars. The laterally offset portions 750A, 750B may be coupled to or integral with the upper and lower connectors 710, 720. The laterally offset portions 750A, 750B may be positioned between the upper and lower connectors 710, 720. The middle portion 740 may be positioned at least partially between the laterally offset portions 750A, 750B. One or both of the laterally offset portions 750A, 750B may have a width 752 that is less than, equal to, or greater than the width 742 of the middle portion 740. For example, the width 752 may be from about 5 mm to about 75 mm or from about 10 mm to about 50 mm.

Unlike the middle portion 740, the laterally offset portions 750A, 750B may not be substantially straight and vertical. Rather, the laterally offset portions 750A, 750B may each include a first (e.g., lower) arrangement 760A and a second (e.g., upper) arrangement 760B that are different from one another. In the embodiment shown, the lower arrangements 760A may each include a curved/tortuous shape (e.g., an S-shape). The upper arrangements 760B may each include one or more loops (e.g., circles, ovals, etc.). In the illustrated embodiment, the upper arrangements 760B may each include three loops that are coupled to one another and vertically offset from one another, although other embodiments may include any number of loops and/or other shapes.

Although not shown, in one embodiment, the lower arrangements 760A and/or the upper arrangements 760B may be or include springs that are configured to experience plastic deformation, elastic deformation, or both. Although not shown, in at least one embodiment, the lower arrangements 760A and/or the upper arrangements 760B may be or include torsion bars that are configured to deform in response to a force.

The body 700 may also include a visual indicator 770 that may become visible when the body 700 has experienced plastic deformation. This is discussed in greater detail below.

Figure 9:
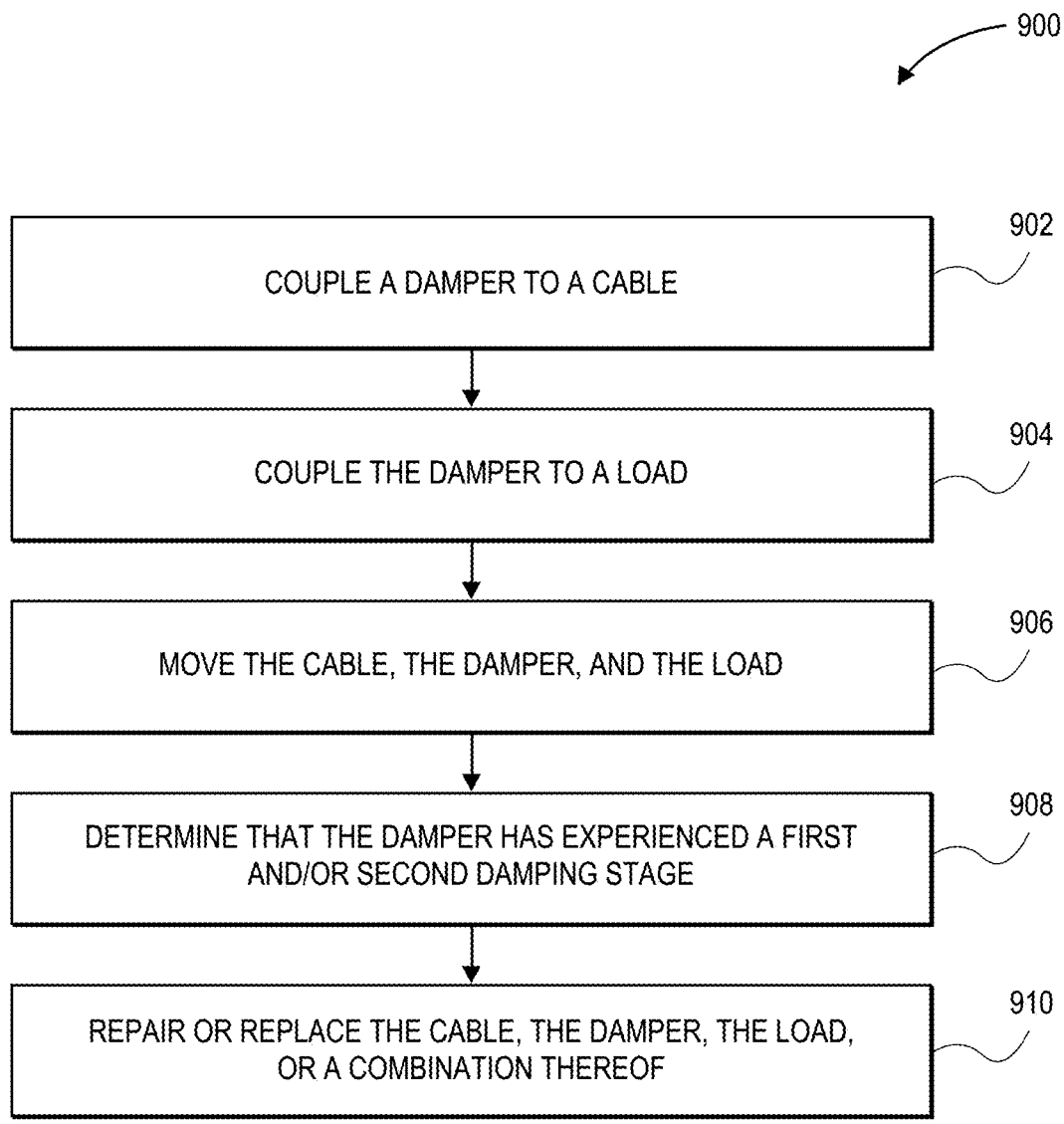
FIG. 9 illustrates a flowchart of a method for damping a force exerted on a cable, according to an embodiment.

FIG. 9 illustrates a flowchart of a method 900 for damping a force exerted on the cable 138, according to an embodiment. An illustrative order of the method 900 is provided below; however, one or more portions of the method 900 may be performed in a different order, performed simultaneously, repeated, or omitted.

The method 900 may include coupling the damper 300 to the cable 138, as at 902. More particularly, this may include coupling the upper connector 410 to the cable 138. As discussed above, the upper connector 410 may be coupled to or integral with the upper connector 710 of the body 700.

The method 900 may also include coupling the damper 300 to the load 200, as at 904. More particularly, this may include coupling the lower connector 420 to the load 200. As discussed above, the lower connector 420 may be coupled to or integral with the lower connector 720 of the body 700.

The method 900 may also include moving the load 200, as at 906. In one embodiment, this may include moving the cable 138, the damper 300, and/or the load 200 horizontally. In another embodiment, this may include moving the cable 138, the damper 300, and/or the load 200 vertically. For example, the cable 138 may lower the damper 300 and the load 200. When the load 200 is the pipe handling equipment (e.g., a TDA) 136, the movement may facilitate receiving a tubular from the catwalk 102, joining two or more tubulars together to form a stand 118, storing the stand 118 in the storage assembly 108, or a combination thereof.

As mentioned above, while the load 200 is moving, the cable 138, the damper 300, and/or the load 200 may (e.g., inadvertently) be obstructed (e.g., snagged) on another object, which may prevent the desired movement. This may introduce slack into the cable 138. Once the cable 138, the damper 300, and/or the load 200 is/are released from the obstruction/snag, the cable 138, the damper 300, and/or the load 200 may experience a sudden (e.g., downward) acceleration. Once the slack in the cable 138 is used up, the load 200 may experience a sudden stop. This may exert a tensile force on the cable 138 and/or the damper 300. As described below the damper 300 may dampen (e.g., reduce) the tensile force on the cable 138.

If the force is less than a first (e.g., lower) threshold, the damper 300 may experience minimal or no plastic strain. More particularly, neither the middle portion 740 nor the laterally offset portions 750A, 750B may stretch or increase in length by more than a nominal amount. Thus, the middle portion 740 and the laterally offset portions 750A, 750B may experience minimal or no permanent vertical deformation. For example, the middle portion 740 and the laterally offset portions 750A, 750B may be/remain at a first (e.g., original) length. In an example, the first threshold may be about 130% of the maximum lifted load 200.

If the force is greater than the first (e.g., lower) threshold but less than a second (e.g., upper) threshold, the damper 300 may experience a first damping stage. In an example, the second (e.g., upper) threshold may be from about 200% to about 300% of the maximum lifted load 200. As the body 700 experiences the first damping stage, the middle portion 740 may experience plastic strain to absorb the kinetic energy. More particularly, the middle portion 740 may stretch, which results in permanent vertical deformation. For example, the middle portion 740 may experience a permanent increase in length from the first length to a second length. The increase in length may be from about 0% to about 50% or about 1% to about 20%. This may cause a cross-sectional area of the middle portion 740 to decrease.

As the body 700 experiences the first damping stage, the laterally offset portions 750A, 750B may also extend. For example, the laterally offset portions 750A, 750B may permanently increase in length by the same amount as the middle portion 740 (e.g., from the first length to the second length). However, the laterally offset portions 750A, 750B may experience less plastic strain than the middle portion 740. In other words, the laterally offset portions 750A, 750B may experience less stretching than the middle portion 740. Instead, the curved/tortuous shape of lower arrangements 760A may at least partially straighten to permanently increase the length of the laterally offset portions 750A, 750B. The bending stiffness of the lower arrangements 760A may be less than an axial stiffness of the middle portion 740. As a result, the middle portion 740 may absorb a majority of the force during the first damping stage.

If the force is greater than the second (e.g., upper) threshold, the damper 300 may experience a second damping stage. As the body 700 experiences the second damping stage, the middle portion 740 may fracture and/or break. Thus, the load 200 may be supported (and the force may be absorbed) by the laterally offset portions 750A, 750B. The laterally offset portions 750A, 750B may have a greater total strength than the cable 138.

During the second damping stage, the the laterally offset portions 750A, 750B may extend further (than they did during the first damping stage). More particularly, the laterally offset portions 750A, 750B may permanently increase in length from the second length to a third length. For example, the curved/tortuous shape of lower arrangements 760A may straighten further (than they did during the first damping stage) to permanently increase the length of the laterally offset portions 750A, 750B. Once the lower arrangements 760 are substantially straightened, the upper arrangements 760B may extend to allow for a soft stop of the lower connector 720 and the load 200 if the middle portion 740 breaks.

The method 900 may also include determining that the damper 300 has experienced the first and/or second damping stage, as at 908. In one embodiment, the determination may be made by a visual inspection. More particularly, a person at the wellsite may see that the length of the body 700 of the damper 300 has increased. For example, the body 700 may include the (e.g., visual) indicator 770, which will be visible below the cover 400 if the body 700 has permanently increased to the second and/or third length. The indicator 770 becoming visible may indicate that the cable(s) 138 and/or the damper 300 has/have been overloaded and damaged and should be inspected, repaired, and/or replaced. In another embodiment, the damper 300 may include the sensor 440 that is configured to measure the stress, strain, and/or plastic deformation experienced by the damper 300.

The method 900 may also include repairing or replacing the cable 138, the damper 300, the load 200, or a combination thereof, as at 910. In one embodiment, the cable 138, the damper 300, and/or the load 200 may be repaired or replaced in response to the determination that the damper 300 has experienced the first and/or second damping stage. In another embodiment, the cable 138, the damper 300, and/or the load 200 may be repaired or replaced in response to a (e.g., visual) inspection after the damper 300 has actuated.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
coupling a damper to a cable and a load such that the damper is positioned between the cable and the load; and
moving the damper, the cable, the load, or a combination thereof, wherein, in response to the movement, slack is introduced into the cable, and the slack is suddenly released, which exerts a tensile load on the damper and the cable, wherein the damper is configured to dampen the tensile load exerted on the cable, and wherein the damper comprises:
a first connector, wherein the cable is coupled to the damper via the first connector;
a second connector, wherein the load is coupled to the damper via the second connector; and
a body extending between and connecting together the first and second connectors, wherein the body permanently increases in length in response to the tensile load applied to the body by the cable and the load, and wherein the body comprises:
a first portion that is substantially straight and extends longitudinally between the first connector and the second connector; and
a second portion, wherein the first portion is configured to experience more plastic strain than the second portion, wherein the second portion comprises two laterally offset portions, wherein the first portion is positioned at least partially between the two laterally offset portions, wherein each of the two laterally offset portions of the second portion comprises a plurality of continuous loops and a tortuous portion, wherein the tortuous portion comprises a plurality of turns extending in opposite upward and downward directions over a common distance between the first connector and the second connector, and wherein the plurality of turns comprises first, second, and third turns over the common distance arranged laterally outward relative to a longitudinal axis of the damper,
wherein the body further comprises a one-piece configuration having the first and second portions.

2. The method of claim 1, wherein the first portion is configured to experience more plastic strain than the second portion during a first damping stage that occurs in response to the tensile load being greater than a first threshold, wherein the first portion is configured to stretch more than the second portion during the first damping stage, wherein the second portion is configured to at least partially straighten while the first portion stretches, wherein the first portion is configured to break, and the second portion is configured to remain intact, during a second damping stage that occurs in response to the tensile load being greater than a second threshold.

3. The method of claim 2, wherein at least a portion of the damper permanently increases in length during the first damping stage, the second damping stage, or both, wherein the damper further comprises a visual indicator that becomes visible once the body of the damper has increased in length, wherein the visual indicator is disposed on the body separate from the first and second portions, and wherein the method further comprises determining that the damper has experienced the first damping stage, the second damping stage, or both in response to viewing the visual indicator.

4. The method of claim 2, further comprising determining that the damper has experienced the first damping stage, the second damping stage, or both using a strain sensor that is coupled to the damper.

5. The method of claim 2, further comprising repairing or replacing the cable, the damper, or both in response to the damper experiencing the first damping stage, the second damping stage, or both.

6. The method of claim 1, wherein the first and second portions are substantially parallel to one another and extend separately between the first and second connectors.

7. The method of claim 1, wherein the damper further comprises a cover positioned between the first and second connectors, and wherein the body of the damper is positioned at least partially within the cover.

8. The method of claim 3, wherein the damper further comprises a cover positioned between the first and second connectors, wherein the body of the damper is positioned at least partially within the cover, and wherein the visual indicator becomes visible below the cover when the body permanently increases in length.

9. The method of claim 1, wherein each laterally offset portion of the second portion further comprises:
a first arrangement including the plurality of continuous loops; and
a second arrangement including the tortuous portion,
wherein the first arrangement and the second arrangement are vertically offset from one another, wherein, prior to the tensile load applied to the body by the cable and the load, the first arrangement is disposed over a first length and the second arrangement is disposed over a second length between the first and second connectors, wherein the first length of the first arrangement is configured to increase by a greater percentage than the second length of the second arrangement in response to the tensile load applied to the body by the cable and the load.

10. A method, comprising:
coupling a damper to a cable and a load such that the damper is positioned between the cable and the load; and
moving the damper, the cable, the load, or a combination thereof, wherein, in response to the movement, slack is introduced into the cable, and the slack is suddenly released, which exerts a tensile load on the damper and the cable, wherein the damper is configured to dampen the tensile load exerted on the cable, and wherein the damper comprises:
a first connector, wherein the cable is coupled to the damper via the first connector;
a second connector, wherein the load is coupled to the damper via the second connector; and
a body extending between and connecting together the first and second connectors, wherein the body permanently increases in length in response to the tensile load applied to the body by the cable and the load, and wherein the body comprises:
a first portion that is substantially straight and extends longitudinally between the first connector and the second connector; and
a second portion, wherein the first portion is configured to experience more plastic strain than the second portion, wherein the second portion comprises a plurality of turns between the first connector and the second connector, wherein the plurality of turns of the second portion defines an S-shape in a vertical position along a longitudinal axis of the damper when arranged in a vertical orientation, a top of the S-shape faces toward the first connector, a bottom on the S-shape faces toward the second connector, a first linking portion extends from the top of the S-shape along a height of the S-shape toward the second connector, and a second linking portion extends from the bottom of the S-shape along the height of the S-shape toward the first connector, and wherein the S-shape is laterally between the first and second linking portions in a lateral direction relative to the longitudinal axis, wherein the body further comprises a one-piece configuration having the first and second portions.

11. The method of claim 10, wherein the second portion comprises first and second laterally offset portions having respective first and second sets of the plurality of turns, wherein the first portion is positioned at least partially between the first and second laterally offset portions, wherein each of the first and second sets of the plurality of turns of the second portion comprises:

a first plurality of turns arranged in a series arrangement along a longitudinal axis between the first and second connectors; and a second plurality of turns arranged in a parallel arrangement along the longitudinal axis between the first and second connectors.

12. The method of claim 10, wherein the second portion comprises one or more continuous loops.

13. The method of claim 10, wherein the first portion is configured to experience more plastic strain than the second portion during a first damping stage that occurs in response to the tensile load being greater than a first threshold, wherein the first portion is configured to stretch more than the second portion during the first damping stage, wherein the second portion is configured to at least partially straighten while the first portion stretches, wherein the first portion is configured to break, and the second portion is configured to remain intact, during a second damping stage that occurs in response to the tensile load being greater than a second threshold.

14. The method of claim 13, wherein at least a portion of the damper permanently increases in length during the first damping stage, the second damping stage, or both, wherein the damper further comprises a visual indicator that becomes visible once the body of the damper has increased in length, wherein the visual indicator is disposed on the body separate from the first and second portions, and wherein the method further comprises determining that the damper has experienced the first damping stage, the second damping stage, or both in response to viewing the visual indicator.

15. The method of claim 14, wherein the damper further comprises a cover positioned between the first and second connectors, wherein the body of the damper is positioned at least partially within the cover, and wherein the visual indicator becomes visible below the cover when the body permanently increases in length.

16. The method of claim 13, further comprising determining that the damper has experienced the first damping stage, the second damping stage, or both using a strain sensor that is coupled to the damper.

17. The method of claim 13, further comprising repairing or replacing the cable, the damper, or both in response to the damper experiencing the first damping stage, the second damping stage, or both.

18. The method of claim 10, wherein the first and second portions are substantially parallel to one another and extend separately between the first and second connectors.

19. The method of claim 10, wherein the damper further comprises a cover positioned between the first and second connectors, and wherein the body of the damper is positioned at least partially within the cover.

20. The method of claim 1, wherein the first portion stretches and decreases in cross-sectional area in response to the tensile load applied to the body by the cable and the load, the first portion fractures in response to the tensile load reaching a threshold, the second portion bends in response to the tensile load, and the second portion bends but does not fracture in response to the tensile load reaching the threshold.

* * * * *